US010656815B2

(12) United States Patent
Suyama et al.

(10) Patent No.: US 10,656,815 B2
(45) Date of Patent: May 19, 2020

(54) PARAMETER CONTROL DEVICE, NON-TRANSITORY STORAGE MEDIUM STORING A PARAMETER CONTROL PROGRAM, AND PARAMETER CONTROL METHOD, THAT UPDATE A PARAMETER OF A CONTROLLED DEVICE ACCORDING TO A PARAMETER ADJUSTED BY BOTH A COOPERATIVE OPERATED PORTION AND A SPECIFIC OPERATION PORTION EACH ASSOCIATED WITH THE CONTROLLED DEVICE

(71) Applicant: YAMAHA CORPORATION, Hamamatsu-shi (JP)

(72) Inventors: Akihiko Suyama, Hamamatsu (JP); Kazuya Mushikabe, Hamamatsu (JP); Keisuke Tsukada, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 74 days.

(21) Appl. No.: 15/817,903

(22) Filed: Nov. 20, 2017

(65) Prior Publication Data

US 2018/0074689 A1     Mar. 15, 2018

Related U.S. Application Data

(63) Continuation of application No. PCT/JP2016/067832, filed on Jun. 15, 2016.

(30) Foreign Application Priority Data

Jun. 16, 2015   (JP) .................................. 2015-121468

(51) Int. Cl.
*G06F 3/048* (2013.01)
*G06F 3/00* (2006.01)
(Continued)

(52) U.S. Cl.
CPC ........ *G06F 3/04847* (2013.01); *G06F 3/0488* (2013.01); *G06T 11/206* (2013.01);
(Continued)

(58) Field of Classification Search
CPC .. H03G 3/00; G06F 3/048; G06F 3/00; G06F 3/16
See application file for complete search history.

(56) References Cited

U.S. PATENT DOCUMENTS 7,571,014 B1 *  8/2009  Lambourne ............ H04R 27/00
                                                    700/94
10,133,536 B2 * 11/2018  Millington ........... H04H 20/103
(Continued)

FOREIGN PATENT DOCUMENTS

| JP | 2008160581 A | 7/2008 |
|----|--------------|--------|
| JP | 2013106168 A | 5/2013 |
| JP | 2015100085 A | 5/2015 |

OTHER PUBLICATIONS

International Search Report issued in Intl. Appln. No. PCT/JP2016/067832 dated Aug. 9, 2016. English translation provided.
(Continued)

*Primary Examiner* — Hugo Molina
(74) *Attorney, Agent, or Firm* — Rossi, Kimms & McDowell LLP (57) ABSTRACT

A parameter control device includes a parameter updating unit, and an operational screen displaying unit. In a case where any one of the individually operated portions is operated, the parameter updating unit changes the parameter of the controlled device, which is associated with the relevant individually operated portion, by following an operation amount of the individually operated portion. In a case where a cooperative operated portion is operated, the respective parameters of the plurality of controlled devices are changed by following an operation amount of the cooperative operated portion. The operational screen displaying unit displays the respective parameters of the plurality of controlled devices, displays the plurality of operated portions in positions corresponding to displays of the parameters of the
(Continued)

respectively associated controlled devices, and displays the cooperative operated portion in a position corresponding to a display of a parameter of the master device.

10 Claims, 7 Drawing Sheets

(51) Int. Cl.
    *G06F 3/0484*     (2013.01)
    *H04N 21/436*     (2011.01)
    *G08C 17/02*     (2006.01)
    *H04N 21/485*     (2011.01)
    *G06F 3/0488*     (2013.01)
    *H04R 27/00*     (2006.01)
    *G06T 11/20*     (2006.01)

(52) U.S. Cl.
    CPC ........... *G08C 17/02* (2013.01); *H04N 21/436* (2013.01); *H04N 21/4852* (2013.01); *H04R 27/00* (2013.01); *G08C 2201/93* (2013.01); *H04R 2400/00* (2013.01); *H04R 2420/07* (2013.01); *H04R 2430/01* (2013.01)

(56) References Cited

U.S. PATENT DOCUMENTS

| | | | |
|---|---|---|---|
| 2005/0060659 A1* | 3/2005 | Verdun | G06F 3/04847 715/772 |
| 2005/0129256 A1* | 6/2005 | Metcalf | H04R 5/00 381/119 |
| 2008/0177822 A1 | 7/2008 | Yoneda | |
| 2013/0121510 A1 | 5/2013 | Yuasa et al. | |
| 2013/0219336 A1* | 8/2013 | Klepper | G06F 3/04847 715/810 |
| 2014/0037107 A1* | 2/2014 | Marino, Jr. | H03G 3/10 381/107 |
| 2014/0181271 A1* | 6/2014 | Millington | G06F 3/167 709/219 |
| 2014/0363024 A1* | 12/2014 | Apodaca | H03G 3/02 381/109 |
| 2015/0100143 A1* | 4/2015 | Gao | H04L 65/4076 700/94 |
| 2015/0256957 A1* | 9/2015 | Kim | H04R 3/12 381/303 |
| 2015/0261410 A1* | 9/2015 | Kumar | G06F 3/04817 715/716 |
| 2016/0291925 A1 | 10/2016 | Kohara et al. | |

OTHER PUBLICATIONS

Written Opinion issued in Intl. Appln. No. PCT/JP2016/067832 dated Aug. 9, 2016.

English translation of Written Opinion issued in Intl. Appln. No. PCT/JP2016/067832 dated Aug. 9, 2016, cited in IDS filed Nov. 20, 2017.

* cited by examiner

PARAMETER CONTROL DEVICE, NON-TRANSITORY STORAGE MEDIUM STORING A PARAMETER CONTROL PROGRAM, AND PARAMETER CONTROL METHOD, THAT UPDATE A PARAMETER OF A CONTROLLED DEVICE ACCORDING TO A PARAMETER ADJUSTED BY BOTH A COOPERATIVE OPERATED PORTION AND A SPECIFIC OPERATION PORTION EACH ASSOCIATED WITH THE CONTROLLED DEVICE

CROSS REFERENCE TO RELATED APPLICATION(S)

This application is a continuation of International Patent Application No. PCT/JP2016/067832 filed on Jun. 15, 2016 which claims the priority of Japanese Patent Application No. 2015-121468 filed on Jun. 16, 2015, the contents of which are incorporated herein by reference in its entirety.

BACKGROUND OF THE INVENTION

1. Field of the Invention

The present invention relates to parameter control in which parameters, such as volume values, of a plurality of audio devices that are connected to each other are controlled.

2. Description of the Related Art

In the related art, for example, similarly to a Digital Living Network Alliance (registered trademark, DLNA), various guidelines are established which enable a network between electronic devices, such as an audio device in the home and a mobile terminal.

In a case where a plurality of audio devices are connected to the network, it is possible to simultaneously reproduce, for example, an audio source, such as music data, by a plurality of audio devices. In addition, it is possible to use terminal devices, such as smartphones, which are connected to the network as remote controllers, and to operate the plurality of audio devices (for example, refer to JP-A-2015-100085 as Patent Literature 1).

Patent Literature 1: JP-A-2015-100085

SUMMARY OF THE INVENTION

In a case where an audio source is simultaneously reproduced by a plurality of audio devices which are connected to a network, there is a case where it is desired to evenly increase and reduce, for example, the volume values of the plurality of audio devices or it is desired to perform minute adjustment on each of the volume values of the audio devices individually.

A non-limited object of the present invention is to provide a parameter control device, a parameter control program, and a parameter control method which are capable of controlling parameters, such as volume values, of a plurality of audio devices which are connected to each other using a desired value.

A parameter control device provided by an aspect of the present invention includes: a plurality of individually operated portions that are respectively associated with a plurality of controlled devices which includes a master device; a cooperative operated portion that is further associated with the master device; a parameter updating unit that updates parameters of the plurality of controlled devices according to operations of the plurality of individually operated portions and the cooperative operated portion; and an operational screen displaying unit, wherein the parameter updating unit changes the parameter of the controlled device, which is associated with the relevant individually operated portion, by following an operation amount of the individually operated portion in a case where any one of the individually operated portions is operated, and changes the respective parameters of the plurality of controlled devices by following an operation amount of the cooperative operated portion in a case where the cooperative operated portion is operated, and wherein the operational screen displaying unit displays the respective parameters of the plurality of controlled devices, displays the plurality of operated portions in positions corresponding to displays of the parameters of the respectively associated controlled devices, and displays the cooperative operated portion in a position corresponding to a display of a parameter of the master device.

According to the aspect of the present invention, it may be possible to control parameters, such as volume values, of a plurality of audio devices which are connected to each other using a desired value.

DETAILED DESCRIPTION OF THE EXEMPLARY EMBODIMENTS

Figure 1:
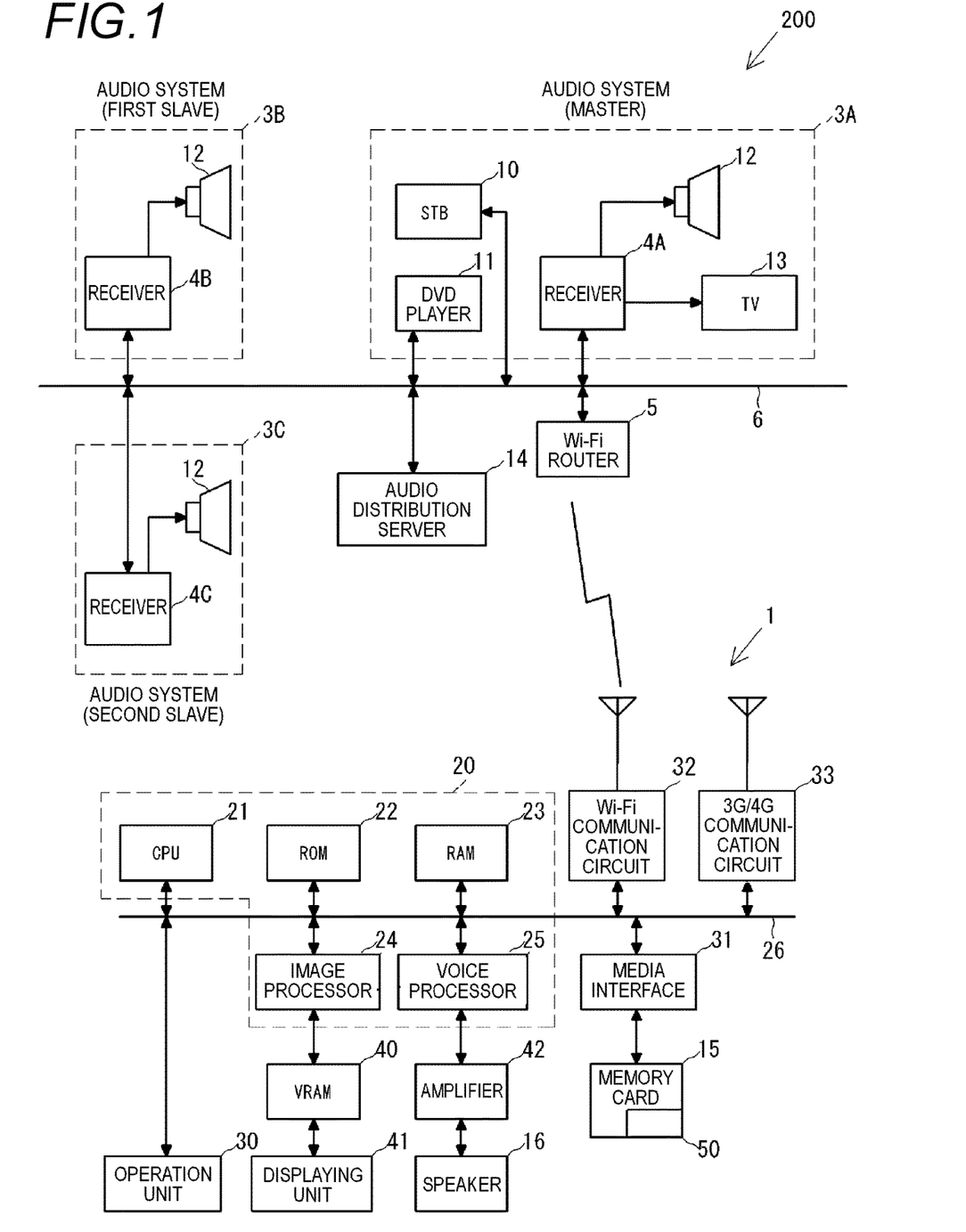
FIG. 1 is a block diagram illustrating a synchronization reproduction system which includes a mobile phone and a plurality of audio systems to which the present invention is applied.

FIG. 1 is a diagram illustrating an example of a synchronization reproduction system 200 including a mobile phone 1, which is a terminal device to which the present invention is applied, and a plurality of audio systems 3A, 3B, and 3C. The synchronization reproduction system 200 includes the plurality of audio systems 3A, 3B, and 3C, an audio distribution server 14, and the mobile phone 1. The plurality of audio systems 3A, 3B, and 3C, the audio distribution server 14, and the mobile phone 1 are connected to a network 6. The network 6 is, for example, a network which mutually connects audio devices which are provided in a plurality of rooms in one building.

The synchronization reproduction system 200 constructs a synchronization reproduction group which synchronizes and reproduces the same audio source using the plurality of audio systems 3A, 3B, and 3C. The synchronization reproduction system 200 assigns functions of a master device and slave devices to the audio systems 3A, 3B, and 3C which are connected to the network 6 in a case where the synchronization reproduction group is constructed. In the embodiment, the function of the master device is assigned to the audio system 3A, and the function of the slave device is assigned to the audio systems 3B and 3C. Hereinafter, there are cases where the audio system 3A is referred to as a master, the audio system 3B is referred to as a first slave, and the audio system 3C is referred to as a second slave.

Also, it is not necessary to form the synchronization reproduction group using all the plurality of audio systems which are connected to the network, and the synchronization reproduction group may be formed using some of the selected audio system group. For example, the synchronization reproduction group may be formed using the two audio systems 3A and 3B of the three audio systems 3A, 3B, and 3C which are connected to the network. In addition, the synchronization reproduction group may be formed using four audio systems.

The audio distribution server 14 is a network storage which is capable of preserving and delivering an audio source such as a music source. In the audio distribution server 14, the music source or the like, which is reproduced by the audio systems 3A, 3B, and 3C, is preserved. The synchronization reproduction system 200 synchronizes the plurality of audio systems 3A, 3B, and 3C which are connected to the network 6, and reproduces the same music data which is received from the audio distribution server 14.

The audio systems 3A, 3B, and 3C respectively include receivers 4A, 4B, and 4C which are cores. The receivers 4A, 4B, and 4C are respectively connected to the network 6.

It is preferable that a type of the mobile phone 1 is a so-called smartphone. The mobile phone (smartphone) 1 has a communication function of 3G/4G which is a mobile communication network, has a communication function of wireless LAN (Wi-Fi), and is connected to the network 6 through a Wi-Fi router 5.

The mobile phone 1 functions as an audio system controller 100 (hereinafter, simply referred to as the controller 100) illustrated in FIG. 2 by activating an audio system controller program 50 (hereinafter, simply referred to as the program 50) which is an application program (app), and controls the receivers 4A, 4B, and 4C through the network 6 according to an operation performed by a user. A control function includes selection of an audio source, on and off of electric power, up and down of a volume (sound volume) value, and the like. Control of the volume value in the controller 100 is performed by a sliding operation with respect to a slider 418 which is displayed on the controller 100. In addition, the controller 100 may transmit a command with respect to the receiver 4A, and the receiver 4A may control the receivers 4B and 4C.

The audio system 3A is formed in such a way that a speaker 12 and a television (TV) 13 are connected to the receiver 4A. The receiver 4A, a set top box (STB) 10, and a DVD player 11 are connected to the network 6. The receiver 4A outputs a reproduction (reception) video of the audio source to the television 13, and outputs the reproduction (reception) video to the speaker 12. It is possible to perform the selection of the audio source, the up and down of the volume value, or the like using the mobile phone 1, as described above. Meanwhile, a configuration of the audio system 3A is not limited to the drawing. In addition, the audio systems 3B and 3C may have the same configuration as the audio system 3A or may have a different configuration.

Subsequently, a configuration of the mobile phone 1 in which the program 50 is executed will be described. The mobile phone 1 includes a control unit 20, an operation unit 30, a media interface 31, a Wi-Fi communication circuit 32, and a 3G/4G communication circuit 33 on a bus 26. The control unit 20 includes a CPU 21, a ROM (flash memory) 22, a RAM 23, an image processor 24, and a voice processor 25. A video RAM (VRAM) 40 is connected to the image processor 24, and a displaying unit 41 is connected to the VRAM 40. The displaying unit 41 includes a liquid crystal display, and displays a standby screen, a telephone number, or the like. In addition, a screen of the controller 100 which will be described later is displayed on the displaying unit 41. An amplifier 42, which includes a D/A converter, is connected to the voice processor 25, and a speaker 16 is connected to the amplifier 42.

The image processor 24 includes a Graphics Processing Unit (GPU) which generates various video such as the standby screen and the telephone number. In a case where the program 50 is activated, the image processor 24 generates an image of the audio system controller according to an instruction of the CPU 21, and deploys the image on the VRAM 40. The image, which is deployed on the VRAM 40, is displayed on the displaying unit 41.

The voice processor 25 includes a Digital Signal Processor (DSP) which encodes and decodes telephone voice. The voice processor 25 outputs the decoded/generated voice to the amplifier 42. The amplifier 42 amplifies a voice signal and outputs the voice signal to the speaker 16. The Wi-Fi communication circuit 32 performs wireless communication with the Wi-Fi router 5 in conformity to IEEE802.11g standards, and transmits and receives data and messages to and from devices, such as the receivers 4A, 4B, and 4C, on the network 6. The messages are exchanged between the Wi-Fi communication circuit 32 and the receivers 4A, 4B, and 4C in a format defined similarly to a Digital Living Network Alliance (DLNA). The 3G/4G communication circuit 33 performs a voice call and data communication through a mobile phone communication network. The application program is downloaded through data communication. Meanwhile, the application program may not only be downloaded through 3G/4G communication but also be acquired through Wi-Fi communication or an interface such as a USB.

The operation unit 30 includes a touch panel which is formed on the displaying unit 41, and detects a touch operation, the sliding operation, or the like with respect to the touch panel. A memory card 15 is connected to the media interface 31. The memory card 15 is, for example, a micro SD card. The application program, which is downloaded from a server by the 3G/4G communication circuit 33, is preserved in the memory card 15 or the ROM 22. In the mobile phone 1, the program 50 (application program) is preserved in the memory card 15 as illustrated in FIG. 1.

The program 50 includes data, which is necessary to execute a program, in addition to a program main body. The data which is necessary to execute the program includes, for example, a command table or the like. The command table is a table in which control content with respect to the audio system 3A, 3B, and 3C is associated with a command which expresses the control content. The command table stores commands to on and off electric power of the receivers 4A, 4B, and 4C, to increase and reduce the sound volume, to select the audio distribution server 14, the DVD player 11, or the STB10 as an audio source, and the like.

The ROM 22 stores a basic program for executing a telephone call and the application program of the mobile phone 1. In addition, the ROM 22 is a flash memory, and is capable of storing a downloaded application program or the like in addition to the basic program. A work area, which is used in a case where the CPU 20 executes the program 50, is set in the RAM 23. In the work area, for example, a timer area, a counter area, a flag area, and the like of various data are provided.

Figure 2:
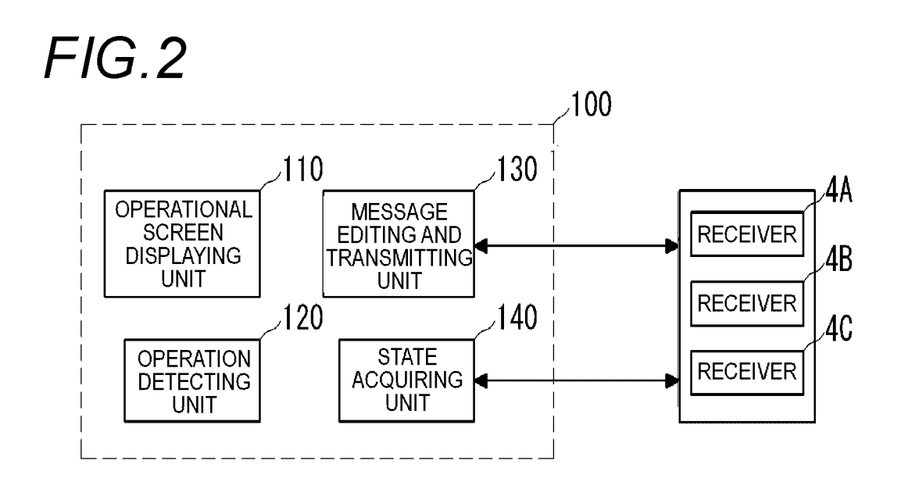
FIG. 2 is a functional block diagram illustrating an audio system controller which is formed by cooperation of the mobile phone and an audio system controller program.

The mobile phone 1 forms the controller 100 as illustrated in FIG. 2 by cooperation with the program 50 which is preserved in the memory card 15, and controls the receiver 4A by transmitting a command message to the receiver 4A through Wi-Fi. The control of the receivers 4B and 4C is performed through the receiver 4A.

The controller 100, which is realized in such a way that the program 50 is read by the mobile phone 1 (hardware), will be described with reference to a functional block diagram of FIG. 2. The controller 100 includes an operational screen displaying unit 110, an operation detecting unit 120, a message editing and transmitting unit 130, and a state acquiring unit 140.

The operational screen displaying unit 110 is realized by the cooperation of the control unit 20, the VRAM 40, the displaying unit 41, and the program 50, and displays various operational screens on the displaying unit 41 of the mobile phone 1.

The operation detecting unit 120 is realized by the cooperation of the control unit 20, the operation unit 30, and the program 50. The operation detecting unit 120 detects, for example, an operation, such as the touch operation or the sliding operation, with respect to the operational screen which is displayed on the displaying unit 41. Operational information, which is detected by the operation detecting unit 120 is input to the operational screen displaying unit 110, the message editing and transmitting unit 130, and the like.

The message editing and transmitting unit 130 is realized by the cooperation of the control unit 20, the Wi-Fi communication circuit 32, and the program 50. The message editing and transmitting unit 130 reads a command corresponding to the operational information from the command table and edits the command message based on the operational information which is input from the operation detecting unit 120. Furthermore, the message editing and transmitting unit 130 transmits the command message to the receivers 4A, 4B, and 4C. The message editing and transmitting unit 130 corresponds to a parameter updating unit according to the present invention.

The state acquiring unit 140 is realized by the cooperation of the control unit 20, the Wi-Fi communication circuit 32, and the program 50. The state acquiring unit 140 queries with respect the receivers 4A, 4B, and 4C, and acquires operating statuses of the receivers 4A, 4B, and 4C. Each of the operating statuses includes an input source, a volume value, and the like which are selected at that time. The query is performed in a case where the controller 100 is activated, in a case where the receivers 4A, 4B, and 4C are activated, or appropriately (for example, every 5 seconds, immediately after a command message is transmitted, or the like). Acquired volume values are reflected in the display of an operational screen 400 which is illustrated in FIG. 3.

Figure 3:
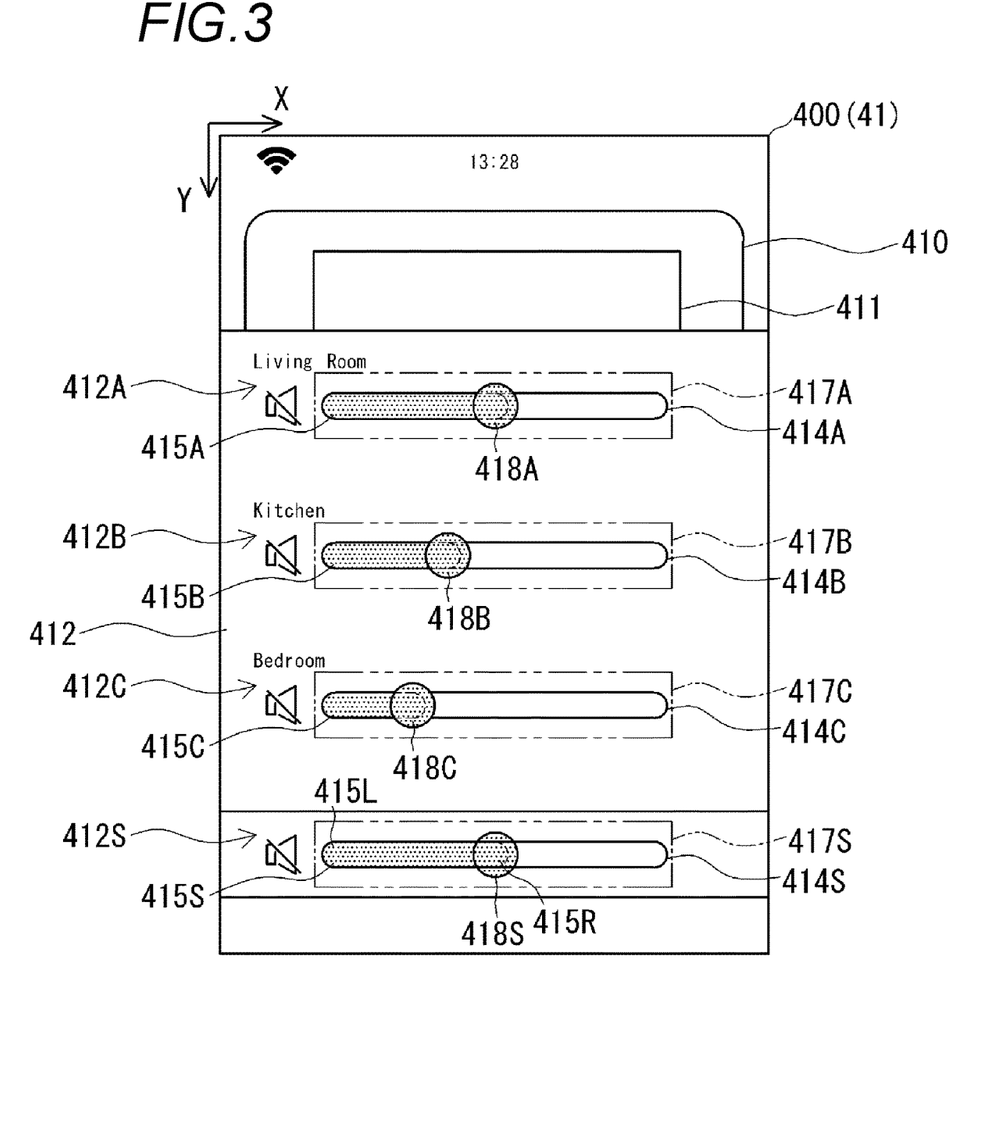
FIG. 3 is a diagram illustrating an example of display of a screen of the audio system controller.

FIG. 3 is a diagram illustrating an example of the operational screen 400 which is displayed by the operational screen displaying unit 110. The operational screen 400 is displayed on the displaying unit 41. In FIG. 3, a reproduction control screen 410 and a volume control screen 412 displayed on the operational screen 400. The volume control screen 412 is displayed to be superimposed on the reproduction control screen 410. The user is capable of operating the operational screen 400 using the touch panel (operation unit 30) which is superimposed on the displaying unit 41.

In the touch panel (operation unit 30), coordinate axes are set in order to grasp positions of the touch operation and the sliding operation on the displaying unit 41. In the embodiment, an upper left of the touch panel (operation unit 30) in the drawing is set to an origin, and a right side from the origin in the drawing is set to, an X axis and a downstream side from the origin in the drawing is set to a Y axis, respectively. The touch operation and the sliding operation are grasped as a change in coordinates of a position in which a finger F is in contact with the touch panel (operation unit 30). Meanwhile, in the description below, a position of a component in the displaying unit 41 will be described using a direction (up and down and right and left) of a posture illustrated in FIG. 3.

In the reproduction control screen 410, the user is capable of controlling start and stop of the selected audio source. In the reproduction control screen 410, an image 411 of the audio source which is synchronized and reproduced, and a start/stop button (not illustrated in the drawing) of the audio source is displayed.

The touch operation of each button is detected by the operation detecting unit 120, and the operational information thereof is delivered to the message editing and transmitting unit 130. For example, in a case where the reproduction button (not illustrated in the drawing) of the reproduction control screen 410 is tapped, the message editing and transmitting unit 130 transmits a reproduction start command or a stop command to the receiver 4A according to a reproduction state at that time. In addition, in a case where a fast-forwarding button (not illustrated in the drawing) is tapped, a subsequent music command or a fast-forwarding command is transmitted to the receiver 4A according to the reproduction state at that time. In addition, in a case where a rewinding button (not illustrated in the drawing) is tapped, a previous music command or a rewinding command is transmitted according to the reproduction state at that time.

In a case where the volume control of the synchronization reproduction group is performed, the volume control screen 412 is displayed to be superimposed on the reproduction control screen 410. The volume control screen 412 includes a synchronization control display area 412S and individual control display areas 412A, 412B, and 412C.

In the synchronization control display area 412S, an image for performing synchronization control on volume values of the audio systems 3A, 3B, and 3C which form the synchronization reproduction group is displayed. In the synchronization control display area 412S, a bar graph display area 414S, a bar graph 415S, a slider display area 417S, and a slider 418S are displayed. In a case where the slider 418S is operated, it is possible to perform synchronization control on volumes of the audio systems 3A, 3B, and 3C. The slider 418S corresponds to a cooperative operated portion according to the present invention.

In the individual control display area 412A, an image for performing individual control on the volume value of the audio system 3A which forms the synchronization reproduction group is displayed. In the individual control display area 412A, a bar graph display area 414A, a bar graph 415A, a slider display area 417A, and a slider 418A are displayed. In a case where the slider 418A is operated, it is possible to perform individual control on the volume value of the audio system 3A. In the embodiment, setting is performed such that the audio system 3A is the master device and the audio system 3A is installed in a living room. The slider 418A corresponds to an individually operated portion according to the present invention.

In the individual control display area 412B, an image for performing individual control on the volume value of the audio system 3B which forms the synchronization reproduction group is displayed. In the individual control display area 412B, a bar graph display area 414B, a bar graph 415B, a slider display area 417B, and a slider 418B are displayed. In a case where the slider 418B is operated, it is possible to perform individual control on the volume value of the audio system 3B. In the embodiment, setting is performed such that the audio system 3B is the slave device (first slave) and the audio system 3B is installed in a kitchen. The slider 418B corresponds to an individually operated portion according to the present invention.

In the individual control display area 412C, an image for performing individual control on the volume value of the audio system 3C which forms the synchronization reproduction group is displayed. In the individual control display area 412C, a bar graph display area 414C, a bar graph 415C, a slider display area 417C, and a slider 418C are displayed. In a case where the slider 418C is operated, it is possible to perform individual control on the volume value of the audio system 3C. In the embodiment, setting is performed such that the audio system 3C is the slave device (second slave), and the audio system 3C is installed in a bedroom. The slider 418C corresponds to an individually operated portion according to the present invention.

Display of the synchronization control display area 412S will be described in detail. In the bar graph display area 414S of the synchronization control display area 412S, the bar graph 415S having a length corresponding to the volume value of the current audio system 3A is displayed. The bar graph display area 414S extends in the X-axis direction. The bar graph display area 414 corresponds to a parameter displaying unit according to the present invention.

The bar graph 415S is a graph which expresses the volume value. The bar graph 415S extends on a right side (a positive direction of the X axis) as the volume value increases while a left end of the bar graph display area 414S is used as the origin, and contracts on a left side (a negative direction of the X axis) as the volume value is reduced. The volume value is expressed by a position of a right end of the bar graph 415S. It is assumed that the left end of the bar graph 415S is a first end 415L and the right end of the bar graph 415S is a second end 415R.

The slider display area 417S covers the whole bar graph display area 414S, and the slider 418S is displayed in a position according to the volume value at that time or a user's operation.

The slider 418S is provided to increase and reduce the volume value according to the sliding operation. In FIG. 3, the slider 418S is disposed to be superimposed on the second end 415R of the bar graph 415S. It is possible to move the slider 418S to the right side and the left side along the X axis by the sliding operation performed by the user. In a case where the slider 418S is moved to the right side, the volume value is increased, and, in a case where the slider 418S is moved to the left side, the volume value is reduced. A position of the slider 418S is grasped using the coordinates. The movement amount of the slider 418S in left and right directions is grasped as displacement of an X coordinate. While the user is operating the slider 418S, a contour line 418R is displayed around the slider 418S (see FIG. 4). The contour line 418R is displayed to make clear a fact that the slider 418S is in the operation state and to make clear the position of the slider 418S. In a case where the sliders 418A, 418B, and 418C are operated, the contour line 418R is displayed around the sliders 418A, 418B, and 418C which are being operated (see FIGS. 5 and 6).

In a case where the user performs the sliding operation on the slider 418S to the right side or the left side, operational information of the sliding operation is detected by the operation detecting unit 120, and is delivered to the message editing and transmitting unit 130 and the operational screen displaying unit 110. The message editing and transmitting unit 130 edits a command message to update the volume value, and transmits the command message to the receiver 4A. The operational screen displaying unit 110 updates the bar graph display area 414S and display content of the slider display area 417S according to operation content.

In a case where the slider 418S is located at the left end of the bar graph display area 414S, the volume value becomes a minimum. In a case where the slider 418S is located at the right end of the bar graph display area 414S, the volume value becomes the maximum. It is possible to change the volume value, for example, in 100 stages from a minimum value to a maximum value. It is possible to change, for example, 100 stages from the minimum value to the maximum value. A first stage (one count) of the volume value is associated with the movement amount of the slider 418S in the left and right directions, that is, the displacement of the X coordinate. The volume value is changed by, for example, 0.5 dB in the first stage (one count). For example, in a case where the slider 418S is moved by five counts from a current position in a volume increase direction (right side), the volume value increases by 2.5 dB. In addition, in a case where the slider 418S is moved by ten counts from the current position in a volume reduction direction (left side), the volume value is reduced by 5.0 dB.

The individual control display areas 412A, 412B, and 412C respectively correspond to the audio systems 3A, 3B, and 3C. Since displays of the individual control display areas 412A, 412B, and 412C are common to the display of the synchronization control display area 412S, the detailed description thereof will not be repeated.

Subsequently, control, in which the volume values of the audio systems 3A, 3B, and 3C are evenly (synchronization) or individually increased and reduced by the controller 100 according to the embodiment, will be described with reference to FIGS. 4 to 7.

Figure 4:
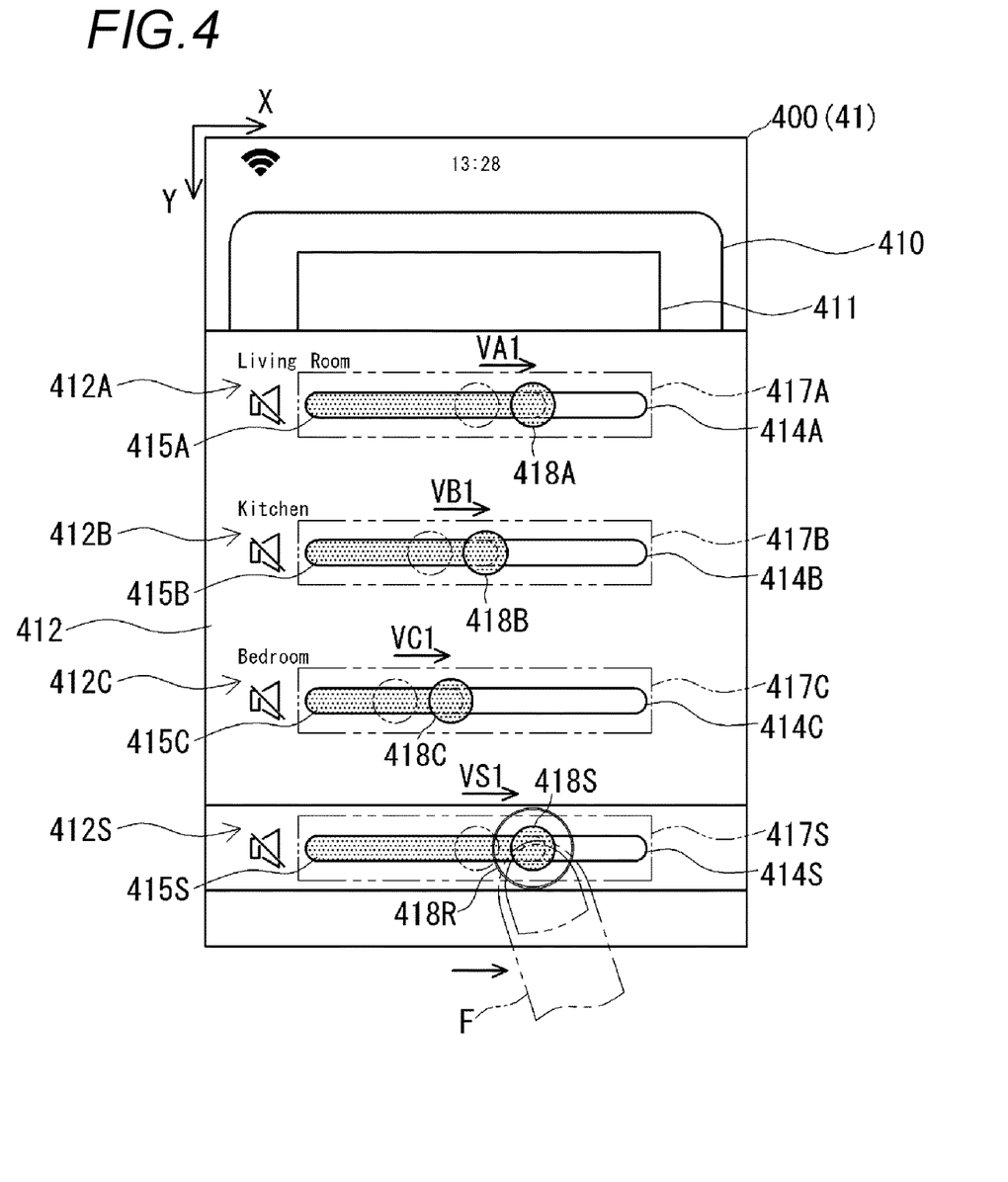
FIG. 4 is a diagram illustrating a state in which volume is controlled by a sliding operation.

First, a case where the volume values of the audio systems 3A, 3B, and 3C are evenly controlled through the synchronization control will be described with reference to FIG. 4. FIG. 4 illustrates an example of an operation of increasing the volume value by performing the sliding operation on the slider 418S, which is the cooperative operated portion of the synchronization control display area 412S, on the right side along the X axis, thereby increasing the volume value.

In FIG. 4, the slider 418S moves in the volume increase direction (right side) as the sliding operation is performed by the user, and the bar graph 415S also extends in the volume increase direction as the slider 418S moves. That is, the right end (second end 415R) of the bar graph 415S moves in the volume increase direction in a state of being superimposed on the slider 418. It is assumed that the movement amount of the slider 418S in the volume increase direction is VS1. The movement amount VS1 of the slider 418S is expressed by, for example, the number of counts. In a case of FIG. 4, for example, the slider 418S moves in the volume increase direction by 5 counts.

As the slider 418S moves in the volume increase direction (right side), the sliders 418A, 418B, and 418C, which are individually operated portions of the individual control display areas 412A, 412B, and 412C, are evenly moves in the volume increase direction (right side). In a case where it is assumed that the movement amounts of the sliders 418A, 418B, and 418C are VA1, VB1, and VC1, respectively, VA1, VB1, and VC1 are equal to the movement amount VS1 of the slider 418S (VA1=VB1=VC1=VS1). That is, the movement of the sliders 418A, 418B, and 418C, which are individually operated portions, follows the movement of the slider 418S which is the cooperative operated portion. In addition, the bar graphs 415A, 415B, and 415C respectively extend in the volume increase direction as the movement of the sliders 418A, 418B, and 418C move. That is, the volume values of the audio systems 3A, 3B, and 3C respectively increase by 5 counts (for example, 2.5 dB) in response to the movement amount of the slider 418S and the bar graph 415S.

In a case where the user ends the sliding operation with respect to the slider 418S, the synchronization control of the volume value ends. The volume values of the audio systems 3A, 3B, and 3C are settled at a point of time in which the operation of the slider 418S is stopped.

As described above, in a case where the slider 418S which is the cooperative operated portion is operated, it is possible to evenly control the volume values of the audio systems 3A, 3B, and 3C which are connected to the network.

Figure 5:
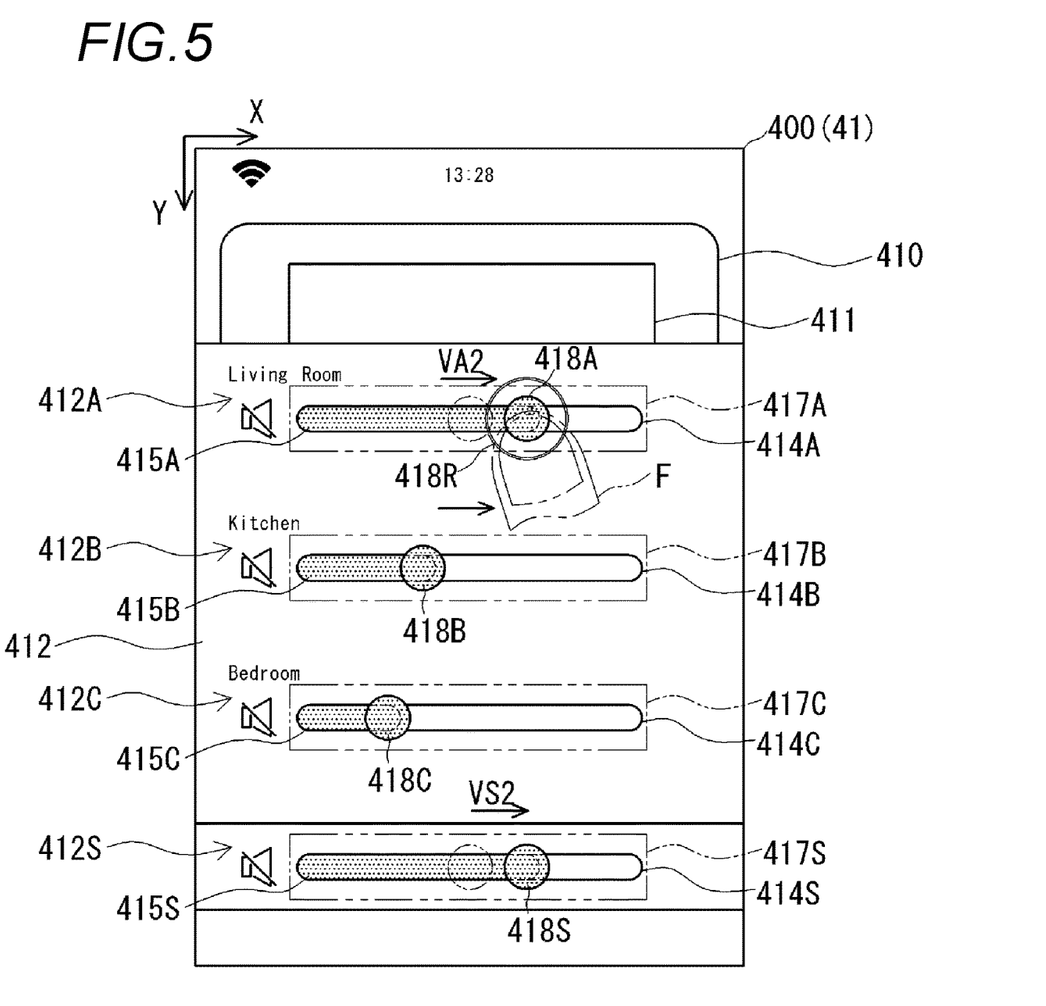
FIG. 5 is a diagram illustrating a state in which volume is controlled by the sliding operation.

Subsequently, a case where the volume value of the audio system 3A which is the master device is individually controlled will be described with reference to FIG. 5. FIG. 5 illustrates an example of an operation of performing the sliding operation on the slider 418A which is the individually operated portion to the right side along the X axis and increasing the volume value of the audio system 3A.

In FIG. 5, the slider 418A moves in the volume increase direction (right side) as the sliding operation is performed by the user, and the bar graph 415A also extends in the volume increase direction as the slider 418A moves. That is, the right end (second end 415R) of the bar graph 415A moves in the volume increase direction in a state of being superimposed on the slider 418A. It is assumed that the movement amount of the slider 418A in the volume increase direction is VA2. For example, it is assumed that the movement amount VA2 of the slider 418A corresponds to movement in the volume increase direction by 5 counts.

As the slider 418A moves in the volume increase direction (right side), the slider 418S which is the cooperative operated portion moves in the volume increase direction (right side). In a case where it is assumed that the movement amount of the slider 418S is VS2, the movement amount VS2 becomes equal to the movement amount VA2 of the slider 418A (VA2=VS2). In addition, the bar graph 415S extends in the volume increase direction as the slider 418S moves.

That is, the volume value of the audio system 3A, which is the master device, increases by 5 counts (for example, 2.5 dB) in response to the movement amounts of the slider 418A and the graph 415A. In addition, in a case where the slider 418 corresponding to the master device is operated, the slider 418S which is the cooperative operated portion also moves in the volume increase direction (right side) in response to the operation of the slider 418 by the same movement amount as that of the slider 418A.

In a case where the user ends the sliding operation with respect to the slider 418A, the individual control performed on the volume value of the audio system 3A ends. The volume value of the audio system 3A is settled at a point of time in which the operation of the slider 418A is stopped.

As described above, in a case where the slider 418A which is the individually operated portion is operated, it is possible to individually control the volume value of the audio system 3A corresponding to the slider 418A among the audio systems 3A, 3B, and 3C which are connected to the network. Therefore, it is possible to adjust only the volume value of the audio system 3A.

In addition, in a case where the slider 418A corresponding to the audio system 3A which is the master device is operated, the slider 418S which is the cooperative operated portion moves along the slider 418A. Therefore, it is possible to match a position of the slider 418S with the slider 418A which is the master device in order to perform the synchronization control.

Figure 6:
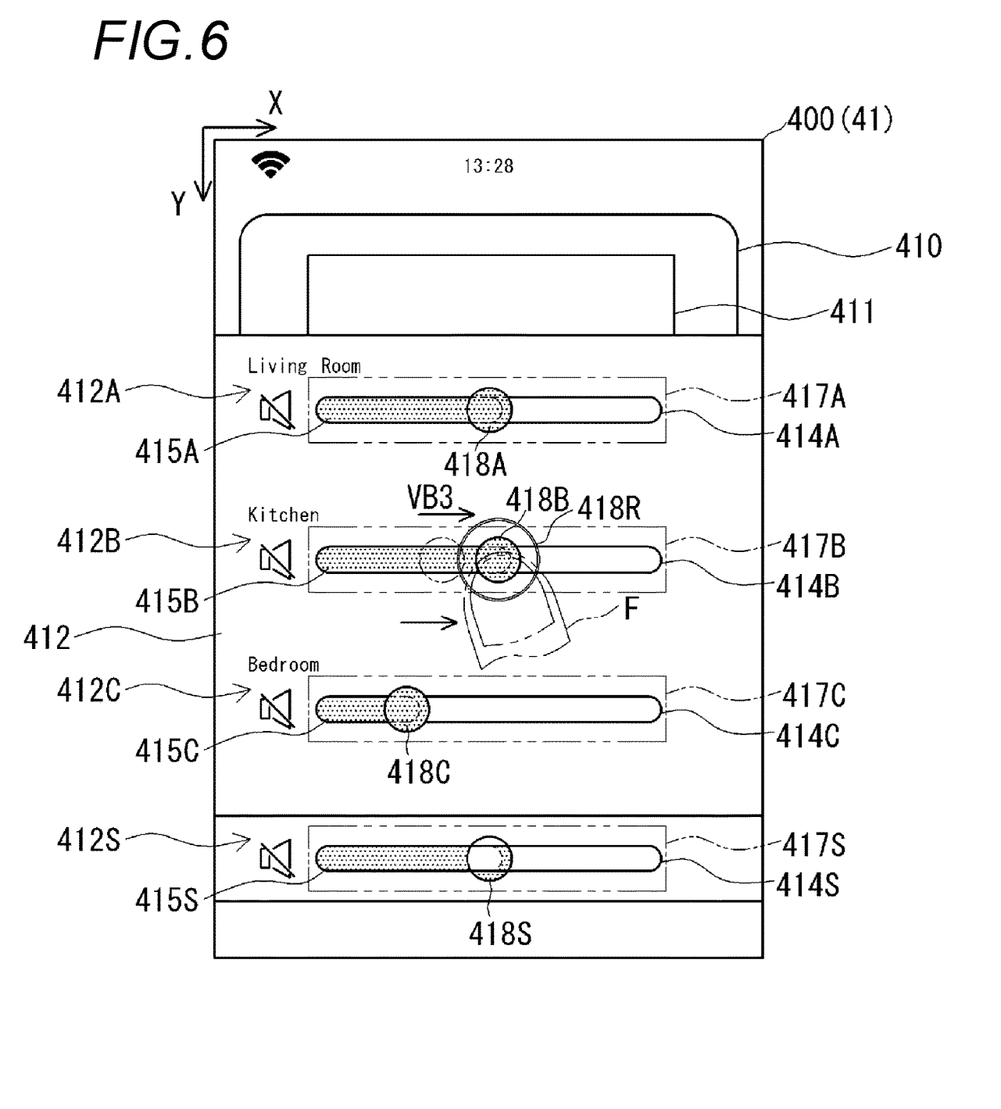
FIG. 6 is a diagram illustrating a state in which volume is controlled by the sliding operation.

Subsequently, a case where the volume value of the audio system 3B which is the slave device is individually controlled will be described with reference to FIG. 6. FIG. 6 illustrates an example of an operation of performing the sliding operation on the slider 418B which is the individually operated portion on the right side along the X axis and increasing the volume value of the audio system 3B.

In FIG. 6, the slider 418B moves in the volume increase direction (right side) as the sliding operation is performed by the user, and the bar graph 415B also extends in the volume increase direction as the slider 418B moves. That is, the right end (second end 415R) of the bar graph 415B moves in the volume increase direction in a state of being superimposed on the slider 418B. It is assumed that the movement amount of the slider 418B in the volume increase direction is VB3. It is assumed that the movement amount VB3 of the slider 418B moves, for example, in the volume increase direction by five counts.

Even in a case where the slider 418B is moved in the volume increase direction (right side), the other sliders 418S, 418A, and 418C do not move.

That is, although the volume value of the audio system 3B which is the slave device increases by five counts (for example, 2.5 dB) in response to the movement amounts of the slider 418B and the bar graph 415B, the other sliders 418S, 418A, and 418C do not move and the volume values of the audio systems 3A and 3C are not changed.

In a case where the user ends the sliding operation with respect to the slider 418B, the individual control performed on the volume value of the audio system 3B ends. The volume value of the audio system 3B is settled at a point of time in which the operation of the slider 418B is stopped.

As described above, in a case where the slider 418B which is the individually operated portion is operated, it is possible to individually control the volume value of the audio system 3B corresponding to the slider 418B among the audio systems 3A, 3B, and 3C which are connected to the network. Therefore, it is possible to adjust only the volume value of the audio system 3B.

In addition, in a case where the slider 418B corresponding to the audio system 3B which is the slave device is operated, the slider 418S which is the cooperative operated portion, and the sliders 418A and 418C corresponding to the audio systems 3A and 3C do not move. Therefore, it is possible to change relative relationship between the volume values of the audio systems 3A, 3B, and 3C which form the synchronization reproduction group.

Also, although detailed description is not performed, in a case where the slider 418C corresponding to the audio system 3C which is the slave device is operated, only the volume value of the audio system 3C is controlled and the other sliders 418S, 418A and 418B do not move.

Figure 7:
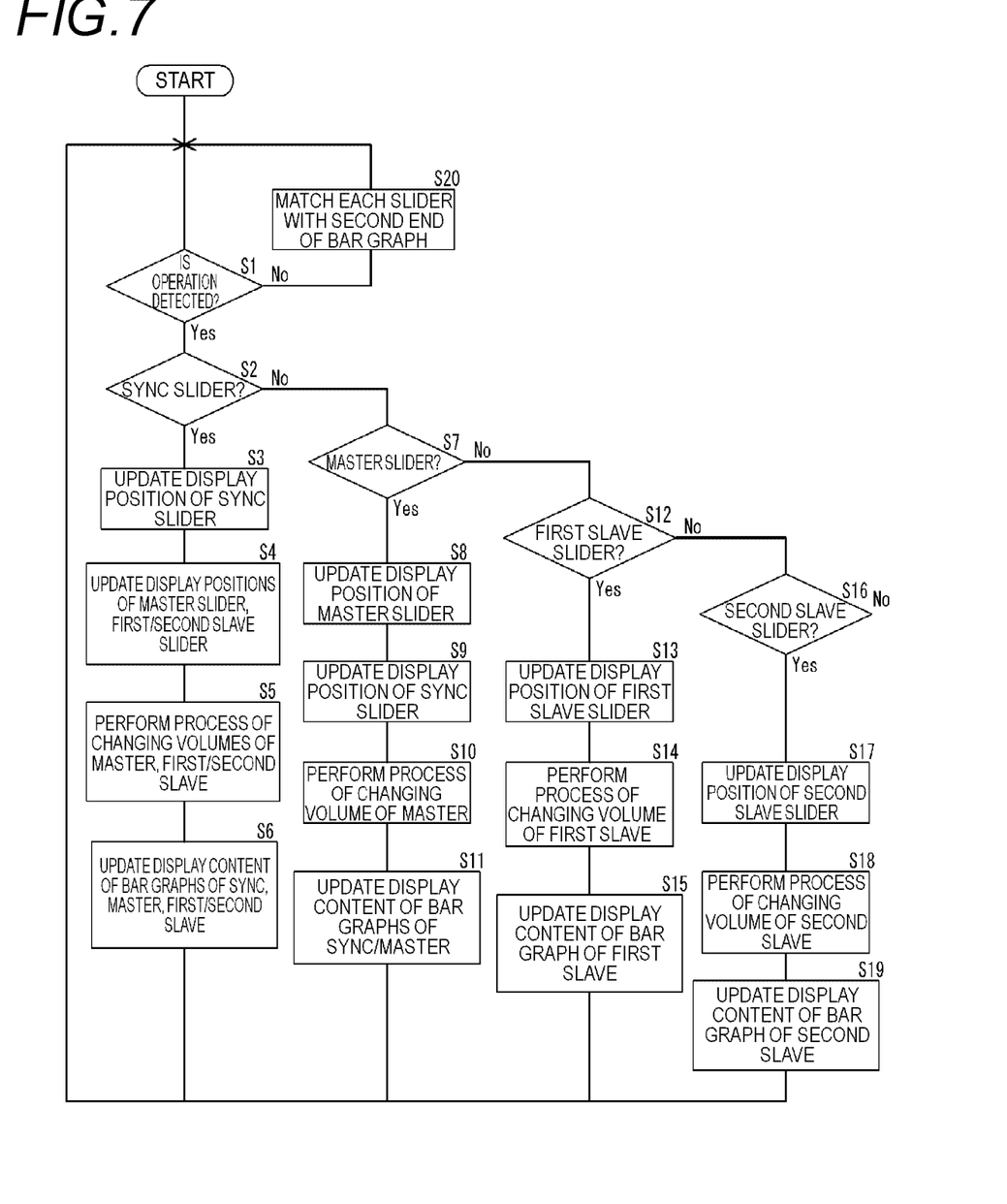
FIG. 7 is a flowchart illustrating an operation performed by the audio system controller.

In a case where the volume values of the audio systems 3A, 3B, and 3C are increased or reduced through the synchronization control or the individual control, an operation of the controller 100 according to the embodiment will be described with reference to flowchart of FIG. 7. Also, in the description below, there is a case where the slider 418S which is the cooperative operated portion is referred to as a synchronization slider. In addition, there are cases where the slider 418A corresponding to the audio system 3A which is the master device is referred to as a master slider, the slider 418B corresponding to the audio system 3B which is the slave device is referred to as a first slave slider, and the slider 418C corresponding to the audio system 3C which is the slave device is referred to as a second slave slider.

In a case where the operation of the controller 100 starts (start), the operation detecting unit 120 determines whether or not the sliding operation with respect to the slider 418S, 418A, 418B, or 418C is detected (S1). In a case where the sliding operation is detected (YES in S1), the operation detecting unit 120 determines whether or not the sliding operation with respect to the slider 418S (synchronization slider) is performed (S2). In a case where the sliding operation with respect to the slider 418S (synchronization slider) is detected (YES in S2), the operational information which is detected by the operation detecting unit 120 is input to the operational screen displaying unit 110 and the message editing and transmitting unit 130. The operational screen displaying unit 110 updates the display position of the slider 418S according to the operation content with respect to the slider 418S (S3). While the user is operating the slider 418S, the contour line 418R is displayed around the slider 418S.

In a case where the display position of the slider 418S (synchronization slider) is updated (S3), the operational screen displaying unit 110 updates the display positions of the sliders 418A (master slider), 418B (first slave slider), and 418C (second slave slider) according to the operation content with respect to the slider 418S (S4). The movement amounts and the movement directions of the sliders 418A (master slider), 418B (first slave slider), and 418C (second slave slider) are equal to the movement amount and the movement direction of the slider 418S (synchronization slider).

Subsequently, the message editing and transmitting unit 130 edits a command message relevant to the volume values corresponding to the movement amounts and the movement directions of the sliders 418A (master slider), 418B (first slave slider), and 418C (second slave slider), and transmits the command message to the receivers 4A, 4B, and 4C (S5). The operational screen displaying unit 110 updates display content of the bar graphs 415S, 415A, 415B, and 415C by respectively associating the movement amounts of the bar graphs 415S, 415A, 415B, and 415C with the movement amounts of the slider 418S (synchronization slider), the sliders 418A (master slider), 418B (first slave slider), and 418C (second slave slider) (S6). Thereafter, the process returns to step 1 (S1).

In contrast, in a case where the sliding operation with respect to the slider 418S (synchronization slider) is not detected (NO in S2), the operation detecting unit 120 determines whether or not the sliding operation with respect to the slider 418A (master slider) is performed (S7). In a case where the sliding operation with respect to the slider 418A (master slider) is detected (YES in S7), the operational information which is detected by the operation detecting unit 120 is input to the operational screen displaying unit 110 and the message editing and transmitting unit 130. The operational screen displaying unit 110 updates the display position of the slider 418A according to the operation content with respect to the slider 418A (S8). While the user is operating the slider 418A, the contour line 418R is displayed around the slider 418A.

In a case where the display position of the slider 418A (master slider) is updated (S8), the operational screen displaying unit 110 updates the display position of the slider 418S (synchronization slider) according to the operation content with respect to the slider 418A (S9). The movement amount and the movement direction of the slider 418S (synchronization slider) become equal to the movement amount and the movement direction of the slider 418A (master slider).

Subsequently, message editing and transmitting unit 130 edits the command message relevant to the volume value in response to the movement amount and the movement direction of the slider 418A (master slider), and transmits the command message to the receiver 4A (S10). The operational screen displaying unit 110 associates the movement amounts of the bar graphs 415S and 415A with the movement amounts of the slider 418S (synchronization slider) and the slider 418A (master slider), respectively, and updates the display content of the bar graphs 415S and 415A (S11). Thereafter, the process returns to step 1 (S1).

In a case where the sliding operation with respect to the slider 418A (master slider) is not detected (NO in S7), the operation detecting unit 120 determines whether or not the sliding operation with respect to the slider 418B (first slave slider) is performed (S12). In a case where the sliding operation with respect to the slider 418B (first slave slider) is detected (YES in S12), the operational information which is detected by the operation detecting unit 120 is input to the operational screen displaying unit 110 and the message editing and transmitting unit 130. The operational screen displaying unit 110 updates the display position of the slider 418B according to the operation content with respect to the slider 418B (S13). While the user is operating the slider 418B, the contour line 418R is displayed around the slider 418B.

In a case where the display position of the slider 418B (first slave slider) is updated (S13), the message editing and transmitting unit 130 edits the command message relevant to the volume value corresponding to the movement amount and the movement direction of the slider 418B (first slave slider), and transmits the command message to the receiver 4B (S14). The operational screen displaying unit 110 associates the movement amount of the bar graph 415B with the movement amount of the slider 418B (first slave slider), and updates the display content of the bar graph 415B (S15). Thereafter, the process returns to step 1 (S1).

In a case where the sliding operation with respect to the slider 418B (first slave slider) is not detected (NO in S12), the operation detecting unit 120 determines whether or not the sliding operation with respect to the slider 418C (second slave slider) is performed (S16). In a case where the sliding operation with respect to the slider 418C (second slave slider) is detected (YES in S16), the operational information which is detected by the operation detecting unit 120 is input to the operational screen displaying unit 110 and the message editing and transmitting unit 130. The operational screen displaying unit 110 updates the display position of the slider 418C according to the operation content with respect to the slider 418C (S17). While the user is operating the slider 418C, the contour line 418R is displayed around the slider 418C.

In a case where the display position of the slider 418C (second slave slider) is updated (S17), the message editing and transmitting unit 130 edits the command message relevant to the volume value corresponding to the movement amount and the movement direction of the slider 418C (second slave slider), and transmits the command message to the receiver 4C (S18). The operational screen displaying unit 110 associates the movement amount of the bar graph 415C with the movement amount of the slider 418C (second slave slider), and updates the display content of the bar graph 415C (S19). Thereafter, the process returns to step 1 (S1).

In addition, in a case where it is determined that the sliding operation with respect to the slider 418S, 418A, 418B, or 418C is not performed in step 1 (No in S1), the process returns to step 1 again in a state in which the slider 418S, 418A, 418B, or 418C is caused to be matched with the right end (second end 415R) of the bar graph 415S, 415A, 415B, or 415C (S20).

Meanwhile, in the embodiment described with reference to FIGS. 3 to 6, only the case where the volume value is increased is described. However, a case where the volume value is reduced is similarly provided.

In the embodiment, the mobile phone 1 is provided as an example of the terminal device to which the present invention is applied. However, the terminal device is not limited to the mobile phone 1. For example, the terminal device may be a tablet or a dedicated controller terminal device.

In the embodiment, the volume value is provided as an example. However, as long as a parameter which follows or individually increased/reduced, any type of another parameter can be applied.

A parameter control device provided by a first aspect of the present invention includes: a plurality of individually operated portions that are respectively associated with a plurality of controlled devices which includes a master device; a cooperative operated portion that is further associated with the master device; a parameter updating unit that updates parameters of the plurality of controlled devices according to operations of the plurality of individually operated portions and the cooperative operated portion; and an operational screen displaying unit, wherein the parameter updating unit changes the parameter of the controlled device, which is associated with the relevant individually operated portion, by following an operation amount of the individually operated portion in a case where any one of the individually operated portions is operated, and changes the respective parameters of the plurality of controlled devices by following an operation amount of the cooperative operated portion in a case where the cooperative operated portion is operated, and wherein the operational screen displaying unit displays the respective parameters of the plurality of controlled devices, displays the plurality of operated portions in positions corresponding to displays of the parameters of the respectively associated controlled devices, and displays the cooperative operated portion in a position corresponding to a display of a parameter of the master device.

In the first aspect, the parameter control device may be configured such that the operational screen displaying unit displays the parameters of the respective controlled devices as bar graph-shaped images that include fixed first ends and second ends which move according to values of the parameters and that extend and contract according to the values of the parameters, displays the individually operated portions in positions that are matched with the respective second ends of the bar graphs which display the parameters of the respective controlled devices, further displays a bar graph which displays a parameter of the master device, and displays the cooperative operated portion in a position, which is matched with the second end of the further displayed bar graph of the master device.

A parameter control program according to a second aspect of the present invention is a parameter control program causing a control unit of a mobile terminal device, which includes a plurality of individually operated portions that are respectively associated with a plurality of controlled devices which includes a master device, and a cooperative operated portion that is further associated with the master device, to function as: parameter updating means for updating parameters of the plurality of controlled devices according to operations of the plurality of individually operated portions and the cooperative operated portion; and an operational screen display means, wherein the parameter updating means changes the parameter of the controlled device, which is associated with the relevant individually operated portion, by following an operation amount of the individually operated portion in a case where any one of the individually operated portions is operated, and changes the respective parameters of the plurality of controlled devices by following an operation amount of the cooperative operated portion in a case where the cooperative operated portion is operated, and wherein the operational screen display means displays the respective parameters of the plurality of controlled devices, displays the plurality of operated portions in positions corresponding to displays of the parameters of the respectively associated controlled devices, and displays the cooperative operated portion in a position corresponding to a display of a parameter of the master device.

In the second aspect, the parameter control program may be configured such that the operational screen display means displays the parameters of the respective controlled devices as bar graph-shaped images that include fixed first ends and second ends which move according to values of the parameters and that extend and contract according to the values of the parameters, displays the individually operated portions in positions that are matched with the respective second ends of bar graphs which display the parameters of the respective controlled devices, further displays a bar graph which displays a parameter of the master device, and displays the cooperative operated portion in a position, which is matched with the second end of the further displayed bar graph of the master device.

A parameter control method provided by a third aspect of the present invention is a parameter control method of a mobile terminal device, which includes a plurality of individually operated portions that are respectively associated with a plurality of controlled devices which includes a master device, and a cooperative operated portion that is further associated with the master device, the method including: changing the parameter of the controlled device, which is associated with the relevant individually operated portion, by following an operation amount of the individually operated portion in a case where any one of the individually operated portions is operated; changing the respective parameters of the plurality of controlled devices by following an operation amount of the cooperative operated portion in a case where the cooperative operated portion is operated; displaying the respective parameters of the plurality of controlled devices; displaying the plurality of operated portions in positions corresponding to displays of the parameters of the respectively associated controlled devices; and displaying the cooperative operated portion in a position corresponding to a display of a parameter of the master device.

Reference signs and numerals are listed to correspond to some elements below.
1: Mobile Phone
3A, 3B, 3C: Audio System
4A, 4B, 4C: Receiver
41: Displaying Unit
50: Audio System Controller Program
100: Audio System Controller
415A, 415B, 415C, 415S: Bar Graph
418A, 418B, 418C, 418S: Slider

What is claimed is:

1. A parameter control device comprising:
a memory storing instructions; and
a processor configured to implement the instructions and execute a plurality of tasks, including:
a displaying task that controls a display device to display a plurality of individually operated portions that are respectively associated with a plurality of controlled devices, including a master device, and a cooperative operated portion further associated with the master device, separate from a master individually operated portion, among the plurality of individually operated portions, associated with the master device;
an updating task that updates parameters of the plurality of controlled devices according to operations of the plurality of individually operated portions and the cooperative operated portion; and
a changing task that changes:
the parameter of the controlled device, which is associated with one of the plurality of individually operated portions, by following an operation amount thereof in a case where the one individually operated portions is operated; and
the respective parameters of the plurality of controlled devices, including the master device, by following an operation amount of the cooperative operated portion in a case where the cooperative operated portion is operated,
wherein the displaying task displays, on the display device:
the respective parameters of the plurality of controlled devices;
the plurality of individually operated portions in positions corresponding to displays of the parameters of the respectively associated controlled devices, including the master device; and
the cooperative operated portion in a position corresponding to:
a display of a parameter of the master device; and
a position corresponding to a displayed position of the master individually operated portion, including updating of a current display position of the cooperative operated portion according to an operation amount of the master individually operated portion.

2. The parameter control device according to claim 1, wherein the displaying task displays on the display device:
the parameters of the respective controlled devices as bar graph-shaped images that include fixed first ends and second ends that move according to values of the parameters and that extend and contract according to the values of the parameters;
the individually operated portions in positions that are matched with the respective second ends of bar graphs that display the parameters of the respective controlled devices;
a bar graph that displays a parameter of the master device; and
the cooperative operated portion in a position, which is matched with the second end of the displayed bar graph of the master device.

3. The parameter control device according to claim 1, wherein the parameters of the plurality of controlled devices include an individual parameter that is individually changed according to a user operation of the respective individually operated portion, other than the master individually operated portion, and a cooperative parameter that is cooperatively changed according to a user operation of the cooperative operated portion.

4. A non-transitory computer-readable storage medium storing a program executable by a mobile terminal device, which includes a display device, to execute a method comprising:
controlling the display device to display a plurality of individually operated portions that are respectively associated with a plurality of controlled devices, including a master device, and a cooperative operated portion further associated with the master device, separate from a master individually operated portion, among the plurality of individually operated portions, associated with the master device;
updating parameters of the plurality of controlled devices according to operations of the plurality of individually operated portions and the cooperative operated portion;
changing the parameter of the controlled device, which is associated with one of the plurality of individually operated portions, by following an operation amount thereof in a case where the one individually operated portions is operated; and
changing the respective parameters of the plurality of controlled devices, including the master device, by following an operation amount of the cooperative operated portion in a case where the cooperative operated portion is operated,
wherein the controlling of the display device:
displays the respective parameters of the plurality of controlled devices;
displays the plurality of individually operated portions in positions corresponding to displays of the parameters of the respectively associated controlled devices, including the master device; and
displays the cooperative operated portion in a position corresponding to:
a display of a parameter of the master device; and
a position corresponding to a displayed position of the master individually operated portion, including updating of a current display position of the cooperative operated portion according to an operation amount of the master individually operated portion.

5. The non-transitory computer-readable storage medium according to claim 4, wherein the controlling of the display device to display on the display device:
the parameters of the respective controlled devices as bar graph-shaped images that include fixed first ends and second ends that move according to values of the parameters and that extend and contract according to the values of the parameters;
the individually operated portions in positions that are matched with the respective second ends of bar graphs that display the parameters of the respective controlled devices;

a bar graph that displays a parameter of the master device; and displays the cooperative operated portion in a position, which is matched with the second end of the displayed bar graph of the master device.

6. A parameter control method for a mobile terminal device that includes a display device, the method comprising:

controlling the display device to display a plurality of individually operated portions that are respectively associated with a plurality of controlled devices, including a master device, and a cooperative operated portion further associated with the master device, separate from a master individually operated portion, among the plurality of individually operated portions, associated with the master device;

updating parameters of the plurality of controlled devices according to operations of the plurality of individually operated portions and the cooperative operated portion;

changing the parameter of the controlled device, which is associated with one of the plurality of individually operated portions, by following an operation amount thereof in a case where the one individually operated portions is operated; and changing the respective parameters of the plurality of controlled devices, including the master device, by following an operation amount of the cooperative operated portion in a case where the cooperative operated portion is operated, wherein the controlling of the display device:

displays the respective parameters of the plurality of controlled devices;

displays the plurality of individually operated portions in positions corresponding to displays of the parameters of the respectively associated controlled devices, including the master device; and displays the cooperative operated portion in a position corresponding to:

a display of a parameter of the master device; and a position corresponding to a displayed position of the master individually operated portion, including updating of a current display position of the cooperative operated portion according to an operation amount of the master individually operated portion.

7. The parameter control method according to claim 6, wherein the parameters of the plurality of controlled devices include an individual parameter that is individually changed according to a user operation of the respective individually operated portion, other than the master individually operated portion, and a cooperative parameter that is cooperatively changed according to a user operation of the cooperative operated portion.

8. A parameter control device comprising:

a display device;

a memory storing instructions; and a processor configured to implement the instructions and execute a plurality of tasks, including:

a displaying task that controls the display device to display a plurality of individually operated portions that are respectively associated with a plurality of controlled devices, including a master device and a cooperative operated portion further associated with the master device, separate from a master individually operated portion, among the plurality of individually operated portions, associated with the master device;

an updating task that updates parameters of the plurality of controlled devices according to operations of the plurality of individually operated portions and the cooperative operated portion; and a changing task that changes:

the parameter of the controlled device, which is associated with one of the plurality of individually operated portions, by following an operation amount thereof in a case where the one individually operated portions is operated; and the respective parameters of the plurality of controlled devices, including the master device, by following an operation amount of the cooperative operated portion in a case where the cooperative operated portion is operated, wherein the displaying task displays, on the display device:

the respective parameters of the plurality of controlled devices;

the plurality of individually operated portions in positions corresponding to displays of the parameters of the respectively associated controlled devices, including the master device; and the cooperative operated portion in a position corresponding to:

a display of a parameter of the master device; and a position corresponding to a displayed position of the master individually operated portion, including updating of a current display position of the cooperative operated portion according to an operation amount of the master individually operated portion.

9. The parameter control device according to claim 8, wherein the displaying task displays on the display device:

the parameters of the respective controlled devices as bar graph-shaped images that include fixed first ends and second ends that move according to values of the parameters and that extend and contract according to the values of the parameters;

the individually operated portions in positions that are matched with the respective second ends of bar graphs that display the parameters of the respective controlled devices;

a bar graph that displays a parameter of the master device; and the cooperative operated portion in a position, which is matched with the second end of the displayed bar graph of the master device.

10. The parameter control device according to claim 8, wherein the parameters of the plurality of controlled devices include an individual parameter that is individually changed according to a user operation of the respective individually operated portion, other than the master individually operated portion, and a cooperative parameter that is cooperatively changed according to a user operation of the cooperative operated portion.

\* \* \* \* \*